United States Patent
Kim et al.

[11] Patent Number: 5,904,399
[45] Date of Patent: May 18, 1999

[54] ROTARY TABLE OF A SEAT FOR AUTOMOBILES

[75] Inventors: Hwa Sik Kim; Jin Hyuk Kim, both of Kyungsangbuk-do, Rep. of Korea

[73] Assignee: Hanil Company LTD., Kyungju-si, Rep. of Korea

[21] Appl. No.: 08/936,748

[22] Filed: Sep. 25, 1997

[51] Int. Cl.$^6$ ..................................................... B60N 2/00
[52] U.S. Cl. ............................... 297/344.21; 297/344.22; 248/425
[58] Field of Search ........................ 297/344.21, 344.22; 248/418, 425

[56] References Cited

U.S. PATENT DOCUMENTS

| | | | |
|---|---|---|---|
| 4,705,256 | 11/1987 | Hofrichter | 297/344.22 X |
| 5,380,064 | 1/1995 | Yamano et al. | 297/344.22 |
| 5,441,329 | 8/1995 | Janisch | 297/344.21 |
| 5,482,354 | 1/1996 | Gryp | 297/344.22 |
| 5,568,960 | 10/1996 | Oleson et al. | 297/344.22 |
| 5,584,460 | 12/1996 | Ropp | 248/425 X |
| 5,599,065 | 2/1997 | Gryp et al. | 397/344.22 |
| 5,685,514 | 11/1997 | Carnahan et al. | 248/425 |
| 5,720,462 | 2/1998 | Brodersen | 297/344.21 X |

Primary Examiner—Peter M. Cuomo
Assistant Examiner—Rodney B. White
Attorney, Agent, or Firm—Jacobson, Price, Holman & Stern, PLLC

[57] ABSTRACT

In a rotary table of a seat for automobiles, a bolt-coupled holder and an end of a push plate are rotated by being engaged with an end of a fixing plate fixed to the bottom of the automobile to reduce a noise caused by the rotation and sustain a shock occurring in a car accident. A projecting disc portion has a thruhole in the center of the fixing plate, fixing grooves with inner sides opened are formed along the border of the thruhole, the push plate coupled with the holder via coupling holes is formed with a fixing groove in front of the coupling holes in a central circular portion, locker fixing holes are formed in front of the fixing groove of the push plate, the holder coupled via the coupling holes along the outer side of a thruhole in the center has an abutment adjacent to the outer border, a fixing groove with outer side opened is formed into one side of the border to fix the border of the thruhole of the fixing plate between the push plate and outer border of the holder, a fixing plate with opposing projecting brackets is fixed via locker fixing holes of the push plate, a handle is installed to the projecting brackets by welding a fixing rod to a concave semi-circle and having a circular hole in the center for being inserted into the projecting brackets, and a locking device having a circular rod inserted into the circular hole of the projecting brackets fits a locking bracket and a spring into the circular rod.

9 Claims, 7 Drawing Sheets

ROTARY TABLE OF A SEAT FOR AUTOMOBILES

BACKGROUND OF THE INVENTION

1. Field of the Invention

The present invention relates to a rotary table mounted to a seat for automobiles, wherein a holder and an end portion of a push plate bolt-coupled to an end portion of a fixing plate fixed to the bottom of the automobile are rotatably installed to rotate the seat by rotating the holder and push plate engaged with the end portion of the fixing plate, thereby minimizing a noise occurring at the rotary table when the seat is rotated and maximally preventing the jolting of the seat when a passenger sits in the seat.

2. Description of the Prior Art

Figure 1:
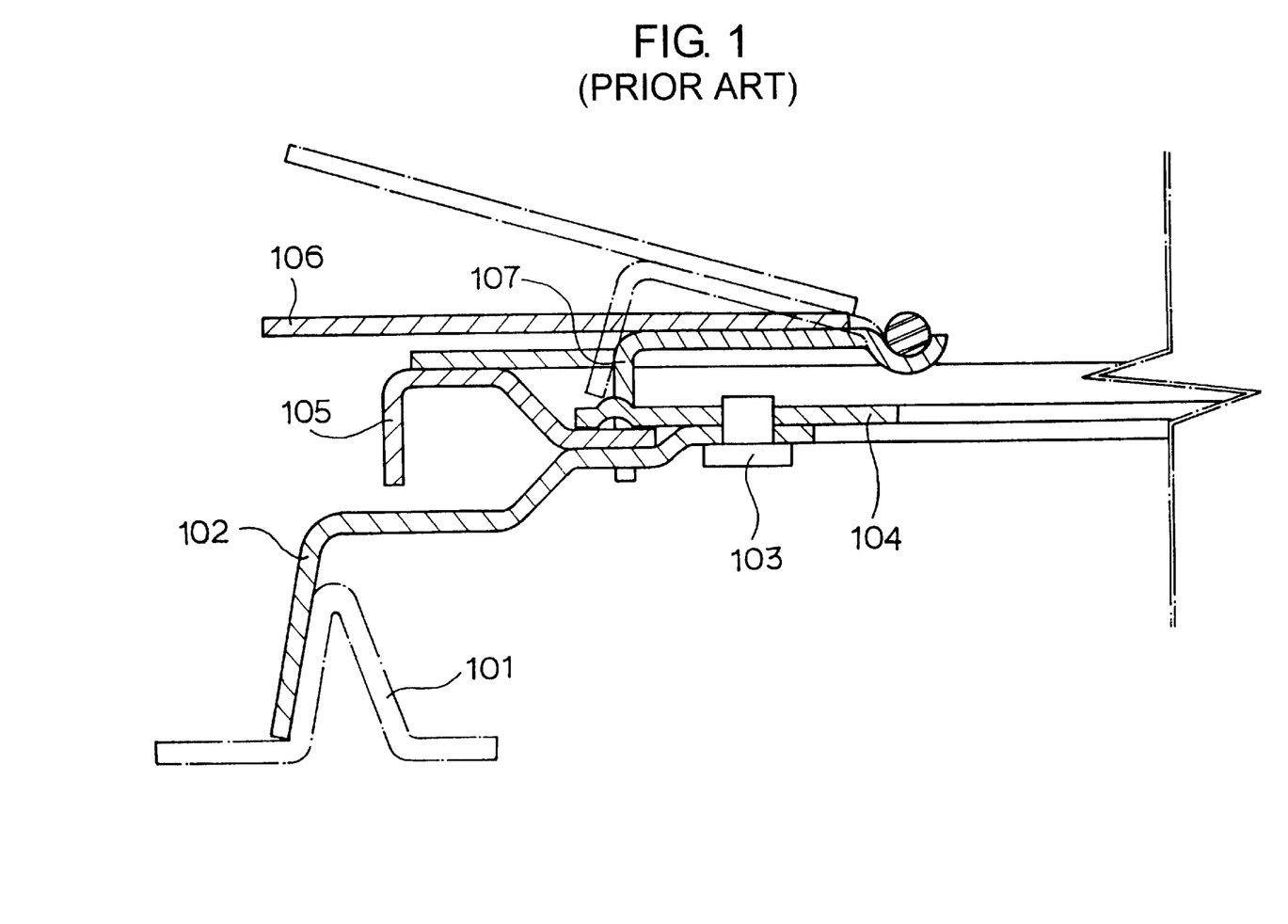
FIG. 1 is a sectional view showing one side of an assembled conventional rotary table of a seat.

A generally-employed conventional rotary table of automobile as shown in FIG. 1 is formed by a fixing plate 102 fixed to a fixing member 101 fixed onto the bottom of the automobile, a holder 104 fixed to fixing plate 102 by means of a bolt 103 and a rotating plate 105 fitted to be rotated between fixing plate 102 and holder 104.

In view of a locking device of the conventional rotary table, a locking jaw 107 of a locker consisting of a locking lever 106 and locking jaw 107 is inserted into/released from a plurality of fixing grooves formed in the same position of rotating plate 105 by the operation of locking lever 106, thereby performing the locking operation.

However, the above-stated conventional rotary table is formed such that rotating plate 105 is fitted to be fixed between fixing plate 102 and holder 104 when the seat is rotated as required. Thus, it is disadvantageous of impeding smooth rotation or inducing a noise.

That is, when the space formed for fitting rotating plate 105 between fixing plate 102 and holder 104 is large, rotating plate 105 fit fixed to be rotated by being fitted between fixing plate 102 and holder 104 is shaken due to the gap between fixing plate 102 and holder 104. In addition to the shaking, rotating plate 105 is in contact with fixing plate 102 and holder 104 while being rotated inciting a frictional sound. Also, if the space between fixing plate 102 and holder 104 is narrowed, rotating plate 105 is not smoothly rotated.

SUMMARY OF THE INVENTION

The present invention is devised to solve the foregoing problems of the prior art rotary table. Therefore, it is an object of the present invention to provide a rotary table of a seat for automobiles, wherein an end portion of a fixing plate fixed to the bottom of the automobile is engaged by a holder and an end portion of a push plate coupled by means of a bolt to be rotated for reducing a noise resulting from the rotation of the seat and for leading an abutment to sustain a shock probably induced by an accident, etc.

To achieve the above object of the present invention, a rotary table of a seat for automobiles includes projecting disc portion having a thruhole in the center of the fixing plate. Also, fixing grooves with inner sides opened are formed along the border of the thruhole, and the push plate coupled with the holder via coupling holes is formed with a fixing groove in front of the coupling holes in a central circular portion. Locker fixing holes are formed in front of the fixing groove of the push plate, and the holder coupled via the coupling holes along the outer side of a thruhole in the center has an abutment adjacent to the outer border. A fixing groove with outer side opened is formed into one side of the border to fix the border of the thruhole of the fixing plate between the push plate and outer border of the holder, a fixing plate formed with opposing projecting brackets is fixed via locker fixing holes of the push plate, and a handle is installed to the projecting brackets by welding a fixing rod to a concave semi-circle and having a circular hole in the center for being inserted into the projecting brackets. In addition, a locking device having a circular rod inserted into the circular hole of the projecting brackets fits a locking bracket and a spring into the circular rod.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

A rotary table of a seat for automobiles according to the present invention includes a fixing plate having one side fixed to a fixing member 101 fixed to a car body by means of a bolt and the other side provided to a prescribed space formed between a push plate and a holder. The push plate is installed to the upper portion of the aforementioned fixing plate and the holder is installed to the lower portion thereof. The holder and push plate is coupled by means of a bolt.

Now, the rotary table according to the present invention constructed such that the fixing plate is fitted into the space between the bolt-coupled push plate and holder will be described in more detail.

Figure 2A:
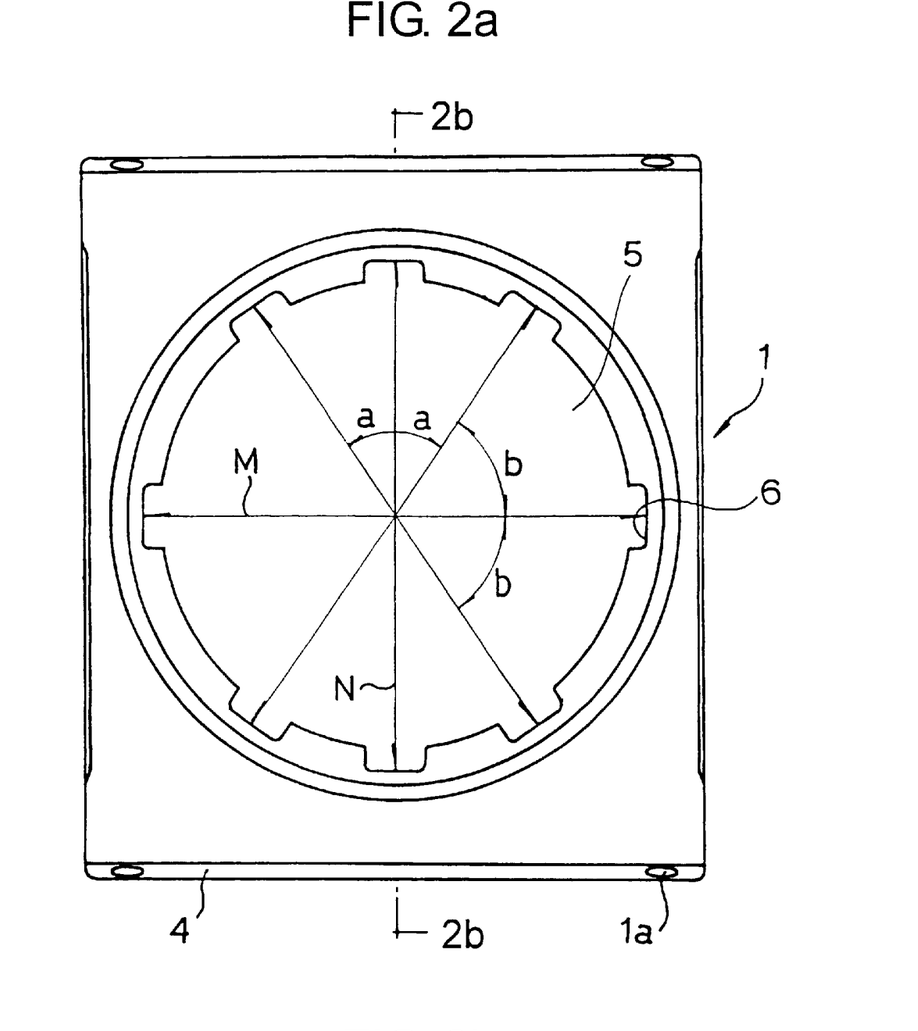
FIG. 2a is a plan view showing the fixing plate of a rotary table according to the present invention.
Figure 2B:
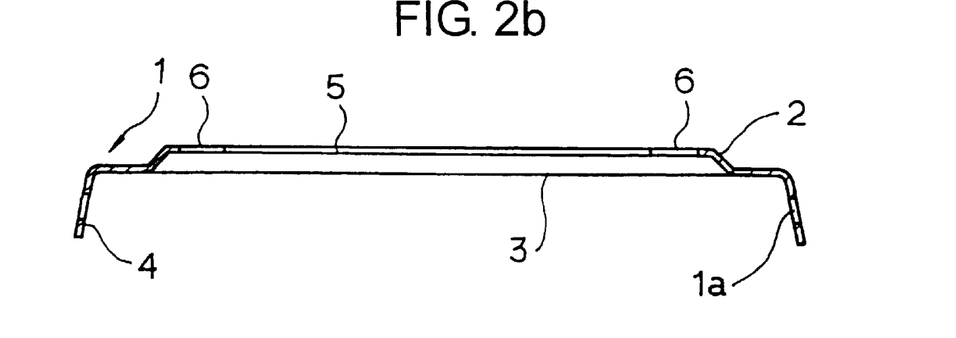
FIG. 2b is a view obtained by right-handedly rotating the sectional view taken along line A—A of FIG. 2a by as many as 90°.

In connection with the fixing plate, as shown in FIG. 2, fixing plate 1 is formed with a projecting disc portion 2 formed with a thruhole 5 in the center thereof, and opposing bending planes 4 are formed to the lower end of fixing plate 1 to have fixing holes 1a. Bending jaws 3 are formed to both ends of fixing plate 1 without being formed with bending planes 4, and fixing grooves 6 are formed along the inner periphery of thruhole 5 provided in the center of projecting disc portion 2 to be spaced by a certain distance from one another.

Here, provided that a center line is designated by N as shown in FIG. 2a and the other center line right-angled with center line N is designated by M, fixing grooves 6 along the inner periphery of thruhole 5 of projecting disc portion 2 are respectively formed where the right and left sides of one center line between two center lines N and M have an angle of 35° and where the right and left sides of one center line have an angle of 55°.

In other words, once one fixing groove is formed into one position of the inner periphery of thruhole 5, the other fixing grooves formed to both sides are to be formed to the positions of being 35° as denoted by 'a' to both sides of one fixing groove, or to be formed to the positions of being 55° as denoted by 'b' to both sides of one fixing groove. By forming the fixing grooves into the above-described positions, the fixing grooves number 8 in total are formed along the periphery of thruhole 5.

In connection with bending planes 4 formed to fixing plate 1, only a pair of bending planes are formed to the opposing sides, and bending jaws 3 formed with the other both sides of fixing plate 1 without being formed with bending planes 4 function for permitting fixing plate 1 to maintain the horizontal balance. Bending planes 4 and bending jaws 3 are provided together with fixing plate 1 when being molded via a press.

Hereinafter, holder 7 coupled to the push plate by means of fixing members such as bolt will be described with reference to FIG. 3.

Figure 3A:
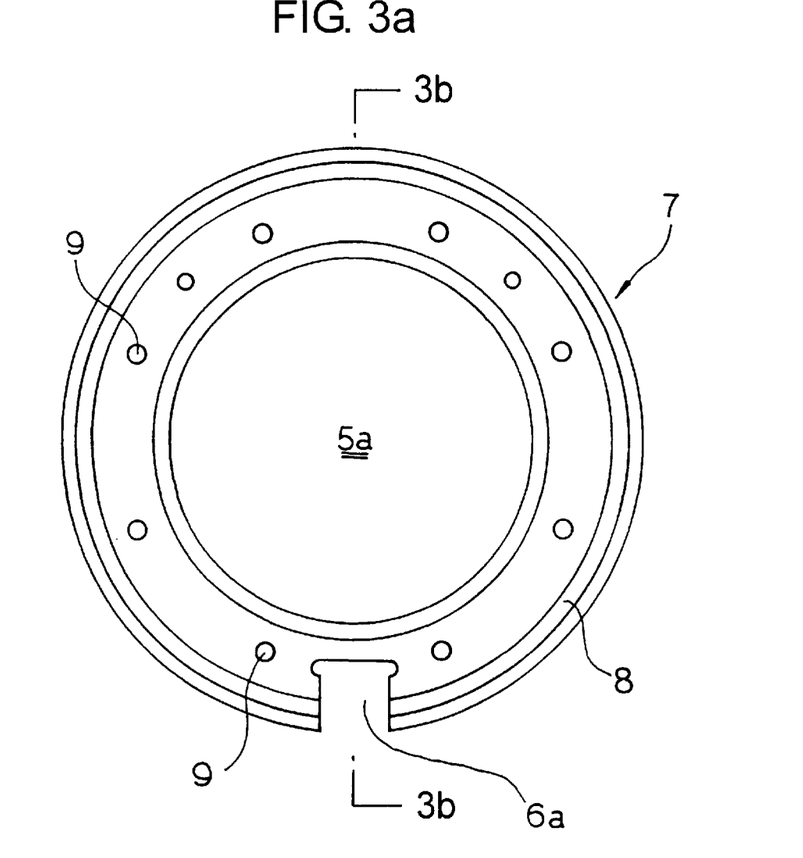
FIG. 3a is a plan view showing the holder of the rotary table according to the present invention.
Figure 3B:
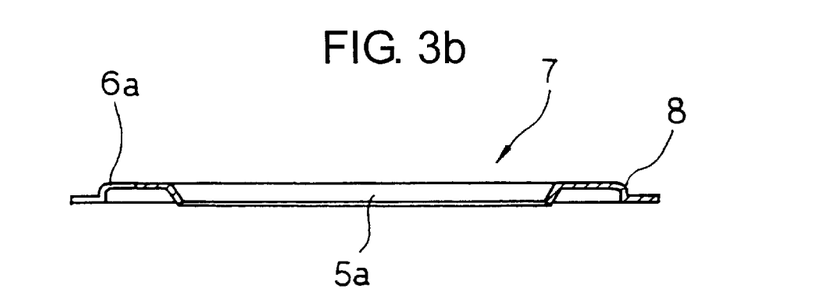
FIG. 3b is a view obtained by right-handedly rotating the sectional view taken along line A—A of FIG. 3a by as many as 90°.

Referring to FIG. 3, holder 7 according to the present invention is formed with a thruhole 5a therein, an abutment 8 in the shape of "L" along the outer periphery, a fixing groove 6a in a proper position of the outer periphery and coupling holes 9 in the upper plane thereof.

Fixing groove 6a formed in the outer periphery of holder 7 is slightly larger than fixing groove 6 formed in fixing plate 1. L-shaped abutment 8 formed along the outer border of holder 7 must be at least higher than the thickness of fixing plate 1.

Figure 4A:
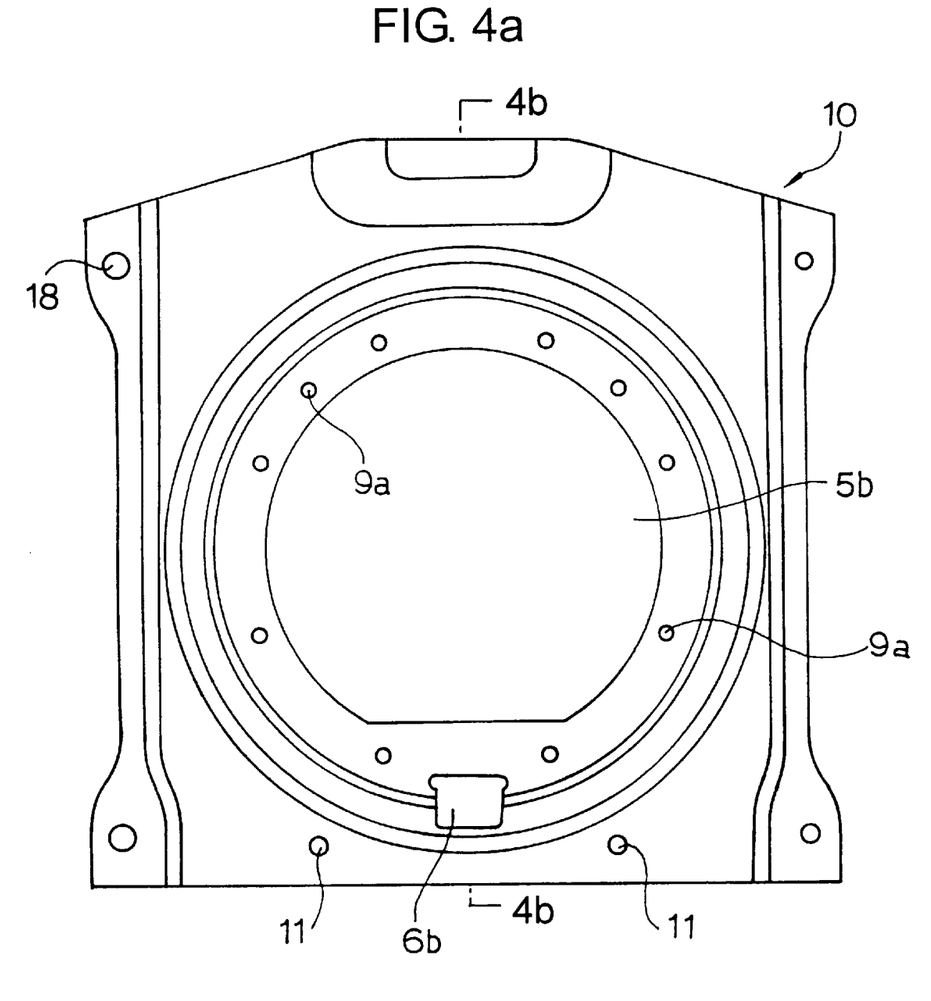
FIG. 4a is a plan view showing the push plate of the rotary table according to the present invention.
Figure 4B:
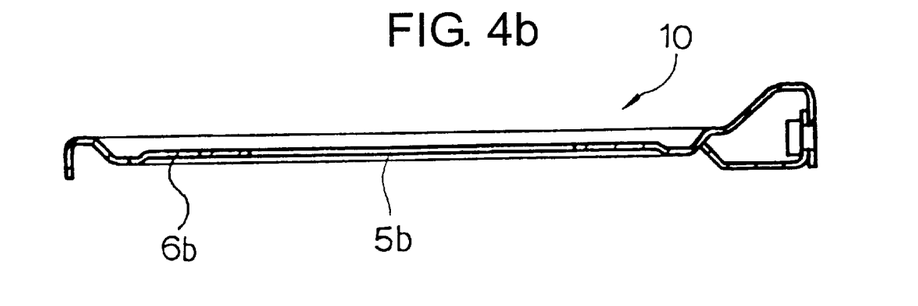
FIG. 4b is a view obtained by right-handedly rotating the sectional view taken along line A—A of FIG. 4a by as many as 90°.

In view of push plate 10, referring to FIG. 4, a thruhole 5b is formed in the center, and coupling holes 9a are formed along the border portion of thruhole 5b. A fixing groove 6b is formed in the outer side of the border of thruhole 5b formed with coupling holes 9a, and locker fixing holes 11 are formed in the preceding end of fixing groove 6b.

Preferably, coupling holes 9a formed in push plate 10 are formed in the same place as coupling holes 9 formed in holder 7 of the same size, and fixing groove 6b formed in the circular border of coupling holes 9a of push plate 10 is slightly smaller than fixing groove 6a formed in holder 7.

A reference numeral 18 denotes a seat coupling hole for being coupled with the seat.

Figure 5A:
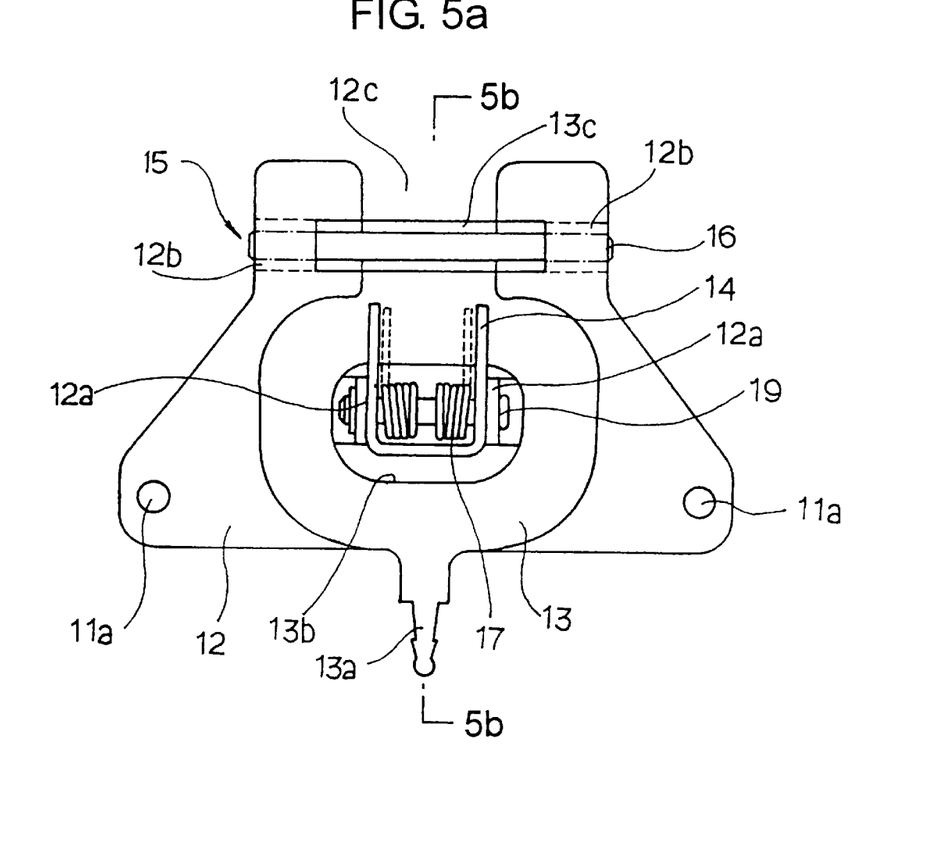
FIG. 5a is a plan view showing the locking device mounted to the rotary table according to the present invention.
Figure 5B:
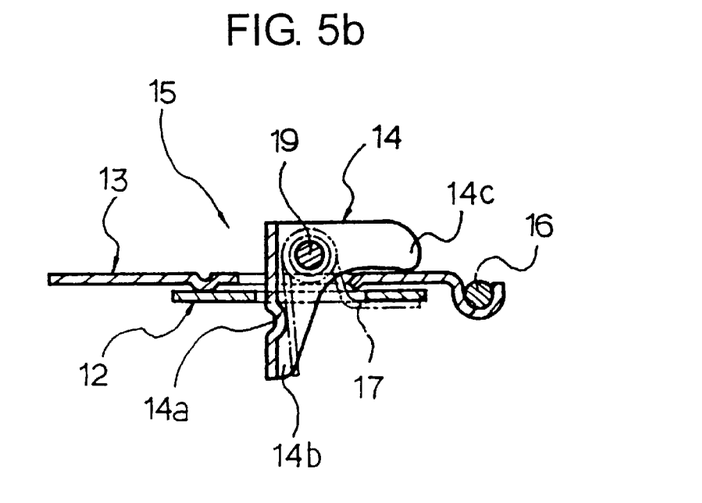
FIG. 5b is a view obtained by right-handedly rotating the sectional view taken along line A—A of FIG. 5a by as many as 90°.

A structure and assembling way of a locking device 15 fixed to push plate 10 via locker fixing holes 11 provided to the preceding end of fixing groove 6b of push plate 10 will be described.

As shown in FIGS. 5a and 5b locking device 15 according to the present invention is formed by a fixing plate 12, a handle 13 and a locking bracket 14. In view of fixing plate 12, locker fixing holes 11a are formed in the preceding end thereof, and projecting brackets 12a are formed to oppose to each other to the center portion. Projecting bracket 12a is formed with a circular hole, and convex semi-circles 12b bulging upward are formed to both sides of an opening 12c in the rear side of projecting brackets 12a.

In connection with handle 13, a fitting portion 13a for fitting handle 13 is formed to the preceding end, and a circular hole 13b is provided into the center. Also, a concave semi-circle 13c bulging downward is formed to the rear side of handle 13.

Locking bracket 14 formed to be shaped as a reversed L ([) is formed with a circular hole in one side. A warping jaw 14a is formed to an inserting portion of locking bracket 14.

In considering the assembling of locking device according to the present invention formed as above, locker fixing holes 11a formed in fixing plate 12 of locking device 15 are to coincide with locker fixing holes 11 of push plate 10, so that fixing plate 12 is coupled to push plate 10 by inserting the bolts. Circular hole 13b of handle 13 is inserted into projecting brackets 12a formed to the center of fixing plate 12 and the center of a fixing rod 16 is inserted to convex semi-circle portion 13c provided to the rear side of handle 13 to be fixed via a welding, etc. Both end portions of fixing rod 16 are inserted to convex semi-circles 12b formed to the rear end of fixing plate 12.

Upon installing handle 13 to fixing plate 12, a cylindrical rod 19 is inserted into the circular hole of two opposing projecting brackets 12a formed to fixing plate 12 to be fixed by inserting locking bracket 14 and a spring 17 into cylindrical rod 19.

That is, when cylindrical rod 19 is inserted into the circular hole of facing projecting brackets 12a formed to fixing plate 12, cylindrical rod 19 passes through the center of the circular hole formed in locking bracket 14 and spring 17 to be inserted into the circular hole formed in the opposite projecting brackets 12a.

As described above, once cylindrical rod 19 is installed, both sides of cylindrical rod 19 are fixed by pins to inhibit the deviation of cylindrical rod 19 from the circular hole of projecting brackets 12a.

Then, locking bracket 14 inserted to lead cylindrical rod 19 to move together with spring 17 will be described.

In locking bracket 14, an inserting portion 14b formed with warping jaw 14a is installed to penetrate through fixing grooves 6, 6a and 6b formed into fixing plate 1, holder 7 and push plate 10. A curving portion 14c being the other one side of locking bracket 14 is to be placed to the upper portion of handle 13, and locking bracket 14 installed to place to the upper portion of handle 13 is to be curved. One end of spring 17 inserted into cylindrical rod 19 together with locking bracket 14 is supported by the rear plane of inserting portion 14b of locking bracket 14, and the other side of spring 17 is supported by the bottom plane of fixing plate 12.

An operation and effect of the rotary table according to the present invention will be described with reference to the embodiment of assembling the rotary table formed as described above.

Figure 6:
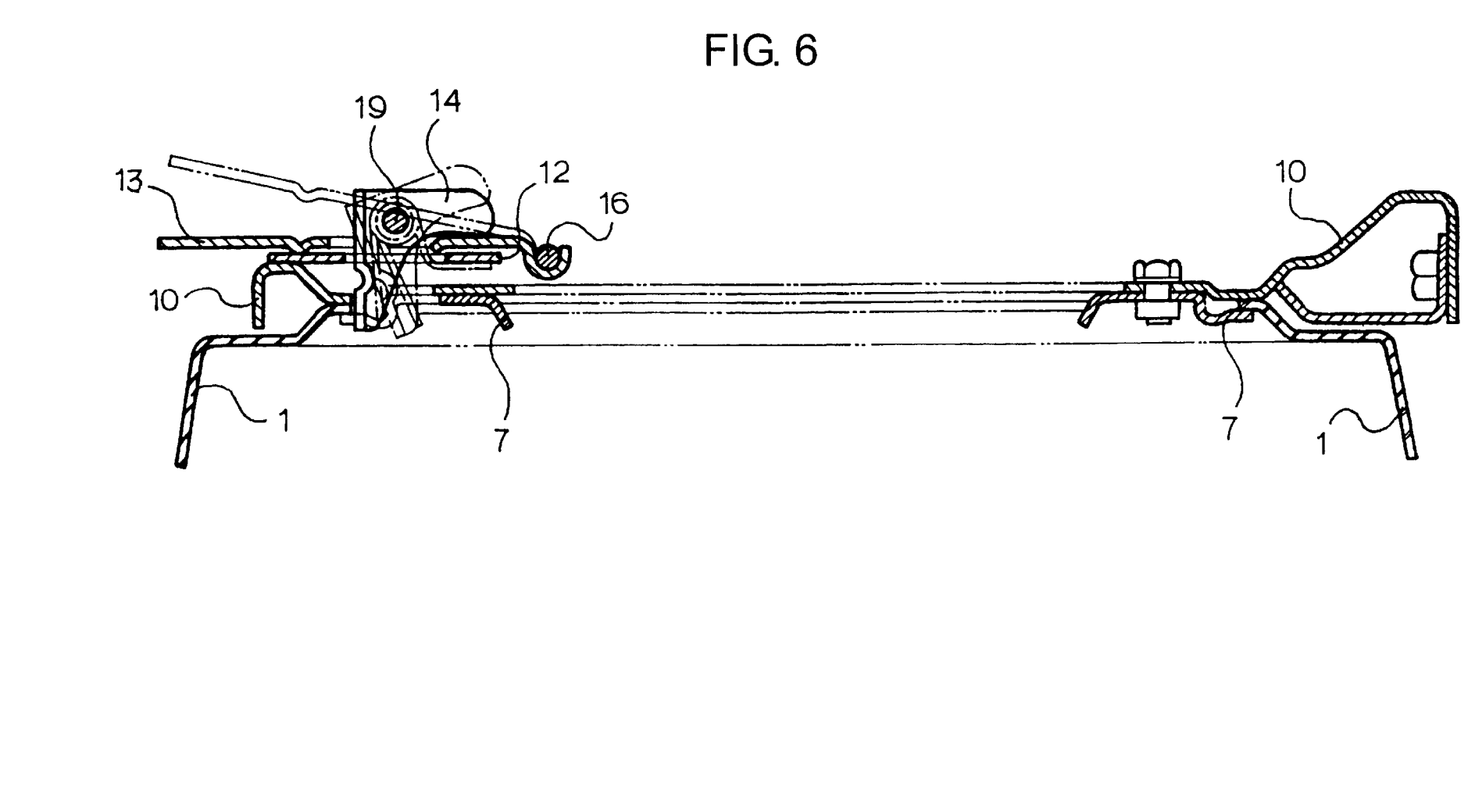
FIG. 6 is a sectional view showing the assembling state of the rotary table according to the present invention.

As shown in FIG. 6, holder 7 is placed to the lower portion of fixing plate 1, and push plate 10 is placed to the upper portion of fixing plate 1. Then, coupling holes 9a and 9 formed into push plate 10 and holder 7 are coupled by means of the bolt to allow holder 7 and push plate 10 to be provided as one body. By doing so, fixing plate 1 is fitted between holder 7 and push plate 10 to be movable in the space between them.

More specifically, once holder 7 and push plate 10 are to be joined together by means of the bolt, L-shaped abutment 8 formed along the outer border of holder 7 forms the space between the border of holder 7 and border of push plate 10 as large as the height of abutment 8. Accordingly, the end of thruhole 5 formed into projecting disc portion 2 of fixing plate 1 fixed to the car body is inserted into the space provided.

When holder 7, push plate 10 and fixing plate 1 are assembled altogether, fixing groove 6a formed in holder 7, fixing groove 6b formed in push plate 10 and one fixing groove among several fixing grooves 6 formed in fixing plate 1 are to coincide with one another.

Once push plate 10 and holder 7 are coupled and fixing plate 1 is inserted to be fixed between push plate 10 and holder 7, fixing plate 1 is coupled to be fixed to the fixing member fixed to the car body. At this time, the seat is fixed to push plate 10 via a seat fixing hole formed in the upper end of push plate 10, and locking device 15 fixed to push plate 10 is installed after being subjected to the foregoing process or is installed to push plate 10 in advance.

Figure 7A:
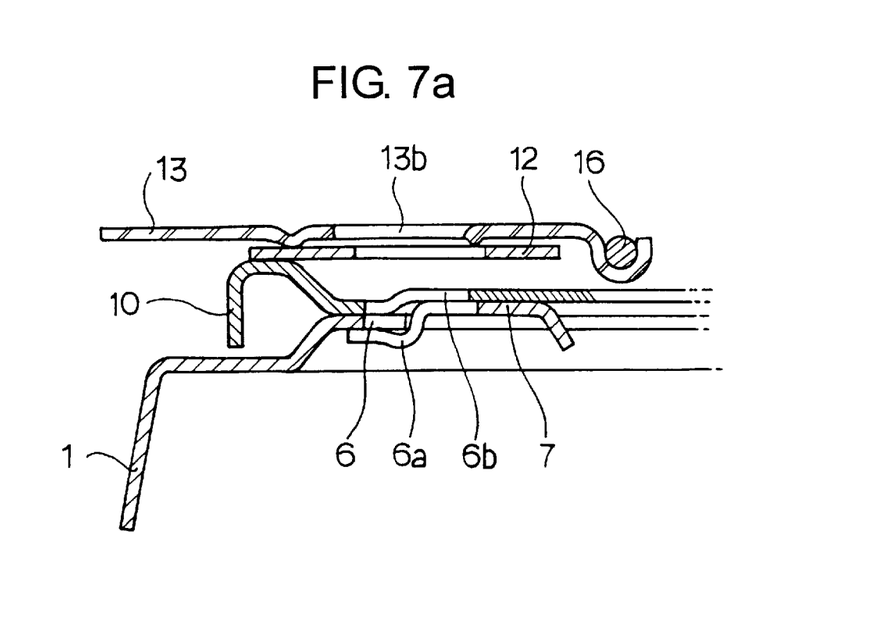
FIG. 7a is a sectional view showing one side of the rotary table according to the present invention.
Figure 7B:
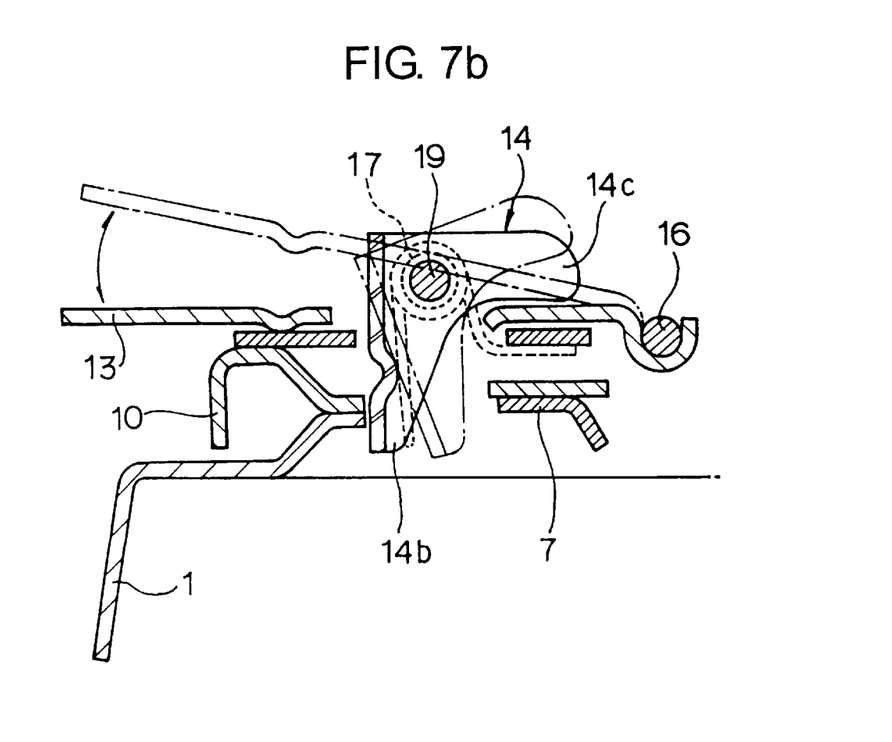
FIG. 7b is a sectional view showing an operating status of the locking device.

According to the rotary table formed as above, when a user draws a knob (not shown) fitted into fitting portion 13a of handle 13 upward, handle 13 is moved upward by using fixing rod 16 as a shaft. At this time, locking bracket 14 placed to the upper portion of handle 13 is moved by using cylindrical rod 19 as a shaft to release inserting portion 14b of locking bracket 14 rearward. If inserting portion 14b is released rearward as described above, inserting portion 14b of locking bracket 14 becomes free from fixing grooves 6 of fixing plate 1, thereby releasing locking device 15.

That is, as shown in FIG. 7, fixing grooves 6a and 6b formed in holder 7 and push plate 10 are to be larger than fixing grooves 6 formed in fixing plate 1. Also, while fixing grooves 6a and 6b formed in holder 7 and push plate 10 are formed from the outside toward the inside or have four sides blocked, fixing grooves 6 of fixing plate are shaped to be open inward. Due to this construction, when locking bracket 14 is moved by the manipulation of handle 13 to rearwardly draw inserting portion 14b of locking bracket 14 having been inserted into respective fixing grooves to (toward the center of the rotary table), inserting portion 14b of locking bracket 14 is drawn solely out of fixing grooves 6 of fixing plate 1.

Once locking device 15 is released by drawing inserting portion 14b of locking bracket 14 out of fixing grooves 6 of fixing plate 1, holder 7 and push plate 10 integrally coupled by means of the bolts are to be rotated by interposing fixing plate 1 fixed to the fixing member fixed to the bottom of the automobile.

When a user releases the knob of handle 13 at the user's desired position by rotating holder 7 and push plate 10 while interposing fixing plate 1, handle 13 is moved downward by the elasticity of spring 17. At the same time, locking bracket 14 is moved downward to insert inserting portion 14b of locking bracket 14 into respective fixing grooves. By doing so, push plate 10 and holder 7 are fixed to fixing plate 1.

In the rotary table according to the present invention as described above, the holder and push plate are integrally coupled to each other, and fixing plate is fixed between the push plate and holder. Thus, when the user rotates the seat, the holder and push plate are rotated by interposing the fixing plate to reduce the noise resulting from the rotation.

Furthermore, the fixing plate is insertedly fixed between the holder and push plate, so that the abutment sustains a shock caused by a probable car accident, etc.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A rotary table of a seat for automobile formed by a fixing plate, a holder and a push plate, comprising:

said fixing plate having a disc portion projecting upwardly from said fixing plate, said disc portion having a thruhole in its center;

said thruhole having a border with fixing grooves with inner sides opened along the border;

said push plate coupled with said holder through coupling holes formed in a central circular portion, having a fixing groove formed on an edge of the central circular portion and locker fixing holes symmetrically formed in one side of the push plate in a vicinity of said fixing groove;

said holder coupled with said push plate through coupling holes formed along an outer area of a thruhole in its center, having an abutment formed along an outer border of the outer area and a fixing groove with outer side opened on one side of the border, thereby fixing said fixing plate between said push plate and said holder;

a locking device having a fixing piece with upwardly projected brackets opposing to each other, the fixing piece being fixed via the locker fixing holes of the push plate, a handle having a fixing rod which is welded to a concave semi-circle portion formed in the handle and a circular hole formed in its center, said handle being installed to the brackets by inserting the brackets into the circular hole, and a locking bracket installed to a cylindrical rod which is inserted into holes formed on each bracket of the fixing piece and having elasticity due to a spring wrapped around the cylindrical rod.

2. The rotary table of a seat for an automobile as claimed in claim 1, wherein each fixing groove formed in said holder and said push plate is larger than said fixing grooves of said fixing plate.

3. The rotary table of a seat for an automobile as claimed in claim 1, wherein total eight fixing grooves are formed along the border of said thruhole in said fixing plate in such a manner that the four of the fixing grooves are located 35 or 55 degrees on both sides on opposite ends of a center line drawn through two opposing fixing grooves of the fixing plate.

4. The rotary table of a seat for an automobile as claimed in claim 1, wherein one end of said spring wrapped around said cylindrical rod fixed between said brackets of the fixing piece is supported by a rear side of an inserting portion, and the other end thereof is supported by a bottom plane of said fixing plate.

5. The rotary table of a seat for an automobile as claimed in claim 1, wherein one side in said locking bracket mating with said cylindrical rod for being fixed to be movable between the brackets of said fixing piece is formed with a rounded curving portion, and an opposite side therein is formed with said inserting portion having a warping jaw.

6. The rotary table of a seat for an automobile as claimed in claim 5, wherein said curving portion forming the one side of said locking bracket is placed to an upper portion of said handle, and said insertion portion forming the opposite side in said locking bracket is made to penetrate through said fixing grooves of said fixing plate, holder and push plate.

7. The rotary table of a seat for an automobile as claimed in claim 1, wherein a curving portion forming one side of said locking bracket is placed to an upper portion of said handle, and an insertion portion forming an opposite side in said locking bracket is made to penetrate through said fixing grooves of said fixing plate, holder and push plate.

8. The rotary table of a seat for an automobile as claimed in claim 1, wherein said fixing piece of said locking device comprises an opening portion in an opposite side of said locker fixing holes and convex semi-circles bulging upward to two opposite sides of said opening portion.

9. The rotary table of a seat for an automobile as claimed in claim 1, wherein a bending jaw is formed bent downward through the disc portion in said fixing plate when being molded via a press.

* * * * *